(12) United States Patent
Huang

(10) Patent No.: US 10,077,349 B2
(45) Date of Patent: Sep. 18, 2018

(54) APPARATUS FOR RECYCLING WASTE RUBBER

(71) Applicant: JIANGSU ZHONGHONG ENVIRONMENTAL PROTECTION TECHNOLOGY CO., LTD., Wuxi (CN)

(72) Inventor: Xianghong Huang, Taizhou (CN)

(73) Assignee: JIANGSU ZHONGHONG ENVIRONMENTAL PROTECTION TECHNOLOGY CO., LTD., Wuxi (CN)

( * ) Notice: Subject to any disclaimer, the term of this patent is extended or adjusted under 35 U.S.C. 154(b) by 300 days.

(21) Appl. No.: 15/009,783

(22) Filed: Jan. 28, 2016

(65) Prior Publication Data

US 2016/0222184 A1    Aug. 4, 2016

Related U.S. Application Data

(63) Continuation-in-part of application No. PCT/CN2013/088368, filed on Dec. 3, 2013.

(30) Foreign Application Priority Data

Jul. 29, 2013  (CN) .......................... 2013 1 0324885

(51) Int. Cl.
  *C08J 11/10*  (2006.01)
  *C08L 21/00*  (2006.01)
  (Continued)

(52) U.S. Cl.
  CPC ................ *C08J 11/10* (2013.01); *B01J 19/24* (2013.01); *B29B 7/42* (2013.01); *B29B 7/748* (2013.01); *B29B 7/7495* (2013.01); *B29B 17/0026* (2013.01); *C08L 21/00* (2013.01); *B01J 2219/00051* (2013.01); *B01J 2219/24* (2013.01); *B29B 7/005* (2013.01); *B29B 7/603* (2013.01);
  (Continued)

(58) Field of Classification Search
  CPC ........................................................ C08J 11/10
  See application file for complete search history.

(56) References Cited

U.S. PATENT DOCUMENTS

2004/0075187 A1    4/2004  Christie

FOREIGN PATENT DOCUMENTS

| CN | 1754904 A | 4/2006 |
| CN | 101434710 A | 5/2009 |

(Continued)

*Primary Examiner* — Donald R Spamer
(74) *Attorney, Agent, or Firm* — Matthias Scholl P.C.; Matthias Scholl

(57) ABSTRACT

An apparatus for recycling waste rubber including a feeding device, a recycling agent feeder, a mixing device, a recycling device, and a controller. The recycling device includes a feed hopper and a recycling reactor. The feeding device and the recycling agent feeder are connected to the mixing device. The recycling device is located at one side of the mixing device. The feed hopper is provided with a second screw feeder, and is connected to the mixing device via the second screw feeder. The feed hopper includes an outlet connected to the recycling reactor. The recycling reactor includes a temperature controller and a cooling device. One end of the cooling device is provided with a discharge outlet. The feeding device, the recycling agent feeder, the mixing device, and the recycling device are electrically connected to the controller.

6 Claims, 2 Drawing Sheets

(51) Int. Cl.
    *B29B 7/42*       (2006.01)
    *B29B 7/74*       (2006.01)
    *B01J 19/24*      (2006.01)
    *B29B 17/00*      (2006.01)
    *B29B 7/00*       (2006.01)
    *B29B 7/60*       (2006.01)
    *B29K 21/00*     (2006.01)

(52) U.S. Cl.
    CPC ........... *B29B 17/00* (2013.01); *B29K 2021/00* (2013.01); *C08J 2321/00* (2013.01); *Y02W 30/62* (2015.05); *Y02W 30/68* (2015.05); *Y02W 30/702* (2015.05)

(56) References Cited

FOREIGN PATENT DOCUMENTS

| | | |
|---|---|---|
| CN | 101786299 A | 7/2010 |
| CN | 101817933 A | 9/2010 |
| CN | 102092105 A | 6/2011 |
| CN | 102898675 A | 1/2013 |
| CN | 102911399 A | 2/2013 |
| CN | 103205016 A | 7/2013 |
| CN | 203625280 U | 6/2014 |
| GB | 1373155 A | 11/1974 |

# APPARATUS FOR RECYCLING WASTE RUBBER

CROSS-REFERENCE TO RELATED APPLICATIONS

This application is a continuation-in-part of International Patent Application No. PCT/CN2013/088368 with an international filing date of Dec. 3, 2013, designating the United States, now pending, and further claims priority benefits to Chinese Patent Application No. 201310324885.6 filed Jul. 29, 2013. The contents of all of the aforementioned applications, including any intervening amendments thereto, are incorporated herein by reference.

BACKGROUND OF THE INVENTION

Field of the Invention

The invention relates to an apparatus for recycling waste rubber.

Description of the Related Art

Typically, dynamic desulfurization tanks and automatic rubber powder plasticizing apparatus are used to recycle and reproduce waste rubber.

The dynamic desulfurization tanks work under high pressure conditions and produce a large amount of gas, which is dangerous and leads to pollution. In addition, the tanks have thick walls thus leading to low thermal efficiency and high energy consumption. And the quality of the recycled rubber is unstable.

The automatic rubber powder plasticizing apparatus has complex structure, short service life and high price, high energy consumption, low working efficiency, low level of automation, and poor stability. In addition, the quality of the product is low.

SUMMARY OF THE INVENTION

In view of the above-described problems, it is one objective of the invention to provide an apparatus for recycling waste rubber which features high production rate, high level of automation, high product quality and strong stability. The apparatus is energy-saving, environmental-friendly, and space-saving.

To achieve the above objective, in accordance with one embodiment of the invention, there is provided an apparatus for recycling waste rubber, comprising a feeding device; a recycling agent feeder; a mixing device; a recycling device, the recycling device comprising a feed hopper and a recycling reactor; and a controller. The feeding device is connected to the mixing device via a first screw feeder. The recycling agent feeder is connected to the mixing device via a pipe. The recycling device is located at one side of the mixing device. The feed hopper is provided with a second screw feeder, and the feed hopper is connected to the mixing device via the second screw feeder. The feed hopper comprises an outlet connected to the recycling reactor. The recycling reactor comprises a temperature controller and a cooling device which is disposed at one end of the recycling reactor; a joint of the recycling reactor and the cooling device is provided with a pressing device and a shearing device; one end of the cooling device is provided with a discharge outlet. The recycling reactor and the cooling device both feature good sealing properties. The feeding device, the recycling agent feeder, the mixing device, and the recycling device are electrically connected to the controller, and the controller controls and monitors the entire recycling process.

In a class of this embodiment, the recycling device comprises a first motor and a reducer. The recycling reactor and the cooling device are spirally fed. The recycling reactor is connected to the reducer. The first motor is connected to the reducer and drives the recycling reactor.

In a class of this embodiment, the cooling device comprises a first spiral cooling pipe and a second spiral cooling pipe. The two spiral cooling pipes are disposed in parallel under the recycling reactor. One end of the first spiral cooling pipe is provided with a third motor. The third motor drives the first spiral cooling pipe to spirally rotate, and further drives the second spiral cooling pipe to spirally rotate via a belt. The discharge outlet is disposed on one end of the second spiral cooling pipe.

In a class of this embodiment, the feeding device, the recycling agent feeder, and the feed hopper each are provided with a stirring device driven by a corresponding motor. The stirring device is controlled by the controller. The stirring device comprises a main shaft which is connected to the corresponding motor. Stirring blades or screws are equally distributed on the main shaft.

In a class of this embodiment, the recycling agent feeder comprises a level gauge. The level gauge transmits real-time parameters to the controller, so that a production status is available.

In a class of this embodiment, the mixing device comprises a measuring bin, a mixing bin, and the second motor. The measuring bin is disposed above the mixing bin, and is connected to the mixing bin via a control valve. The control valve is electrically connected to the controller. The first screw feeder is connected to the measuring bin. The recycling agent feeder is connected to the measuring bin via the pipe. The measuring bin stores the proportioned materials and is ready to supply the materials for the mixing bin. The second screw feeder is connected to the mixing bin. The mixing bin comprises an agitator at a bottom thereof. The second motor is connected to the agitator.

Compared with conventional technologies, the advantages of this apparatus for recycling waste rubber are as follows: the controlling of the apparatus and proportioning of the materials are automatic, so the preparation time and the work load are greatly saved. The proportioning, stirring, desulfurizing, and plasticizing are simultaneously conducted, so that the production efficiency is largely improved, and the environmental pollution of conventional waste rubber recycling is solved. The apparatus has a high yield, low energy consumption, low occupation rate, convenient operation, and the obtained recycled rubber has a high quality.

Figure 1:
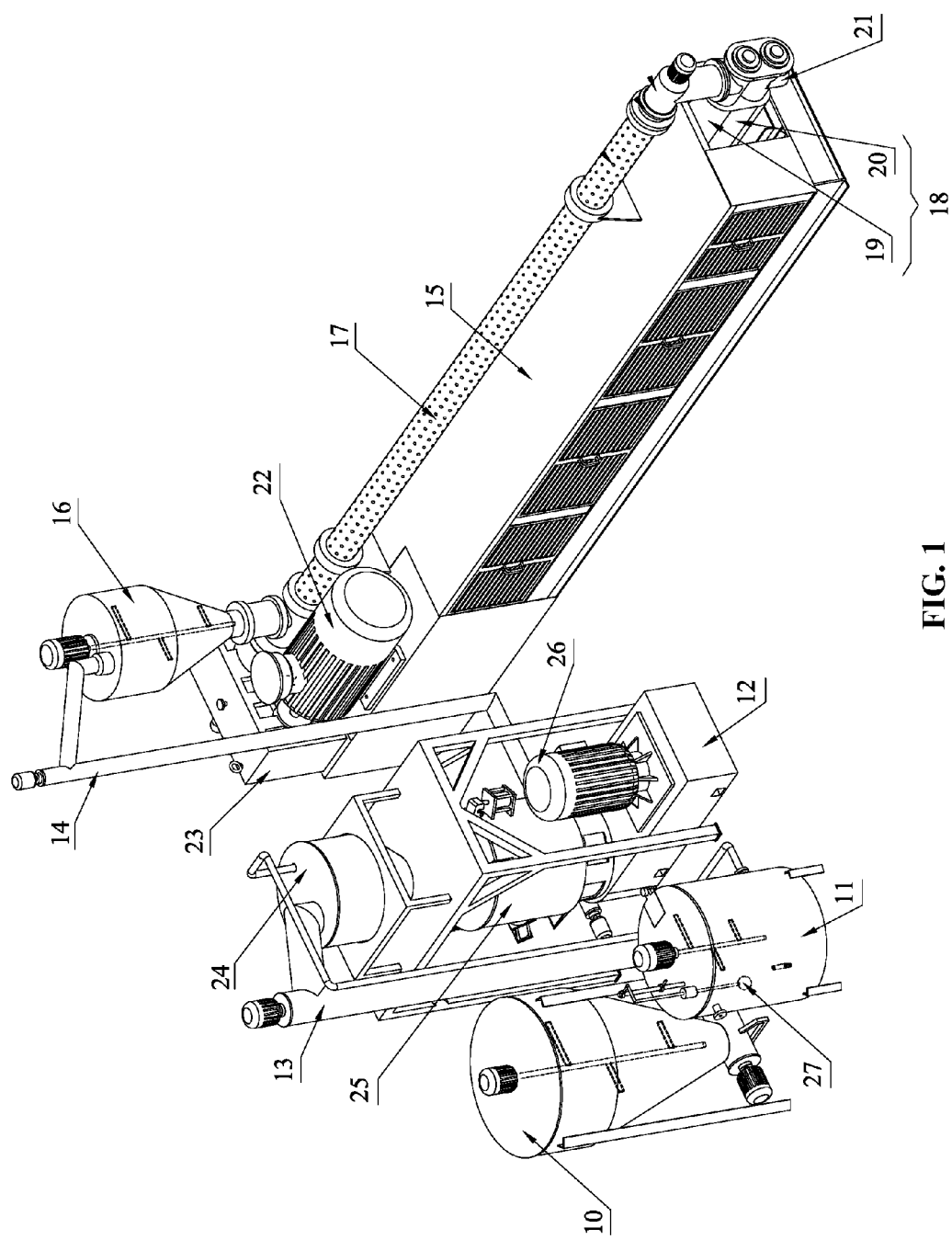
FIG. 1 is a schematic diagram of an apparatus for recycling waste rubber in accordance with one embodiment of the invention.

In the drawings, the following reference numbers are used: 10. Feeding device; 11. Recycling agent feeder; 12. Mixing device; 13. First screw feeder; 14. Second screw feeder; 15. Recycling device; 16. Feed hopper; 17. Recycling reactor; 18. Cooling device; 19. First spiral cooling pipe; 20. Second spiral cooling pipe; 21. Discharge outlet;

22. First motor; 23. Reducer; 24. Measuring bin; 25. Mixing bin; 26. Second motor; 27. Level gauge; and 28. Third motor.

DETAILED DESCRIPTION OF THE EMBODIMENTS

For further illustrating the invention, experiments detailing an apparatus for recycling waste rubber are described below. It should be noted that the following examples are intended to describe and not to limit the invention.

Figure 2:
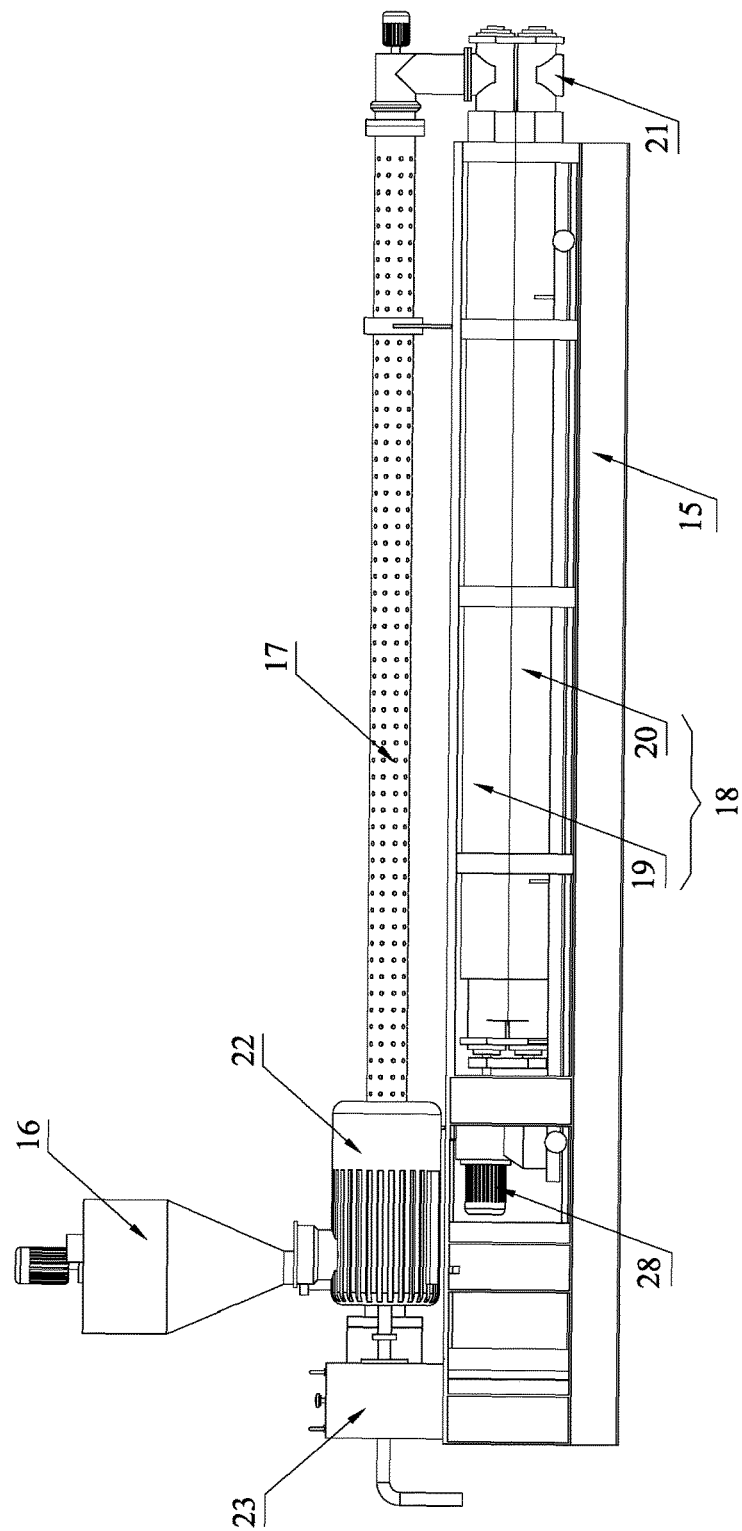
FIG. 2 is a front view of a recycling device in accordance with one embodiment of the invention.

As shown in FIGS. 1-2, an apparatus for recycling waste rubber comprises a feeding device 10, a recycling agent feeder 11, and a controller. The feeding device 10 is connected to a mixing device 12 via a first screw feeder 13. The mixing device 12 is adapted to work under different speeds. The recycling agent feeder 11 is connected to the mixing device 12 via a pipe. A recycling device 15 is disposed at one side of the mixing device 12. The recycling device 15 comprises a feed hopper 16 and a recycling reactor 17. The feed hopper 16 is provided with a second screw feeder 14, and the feed hopper 16 is connected to the mixing device 12 via the second screw feeder 14. The feed hopper comprises an outlet connected to the recycling reactor 17. The recycling reactor 17 comprises a temperature controller and a cooling device 18 which is disposed at one end of the recycling reactor. A joint of the recycling reactor 17 and the cooling device 18 is provided with a pressing device and a shearing device. One end of the cooling device 18 is provided with a discharge outlet 21. The recycling reactor 17 and the cooling device 18 both feature good sealing properties. The feeding device 10, the recycling agent feeder 11, the mixing device 12, and the recycling device 15 are electrically connected to the controller, and the controller controls and monitors the entire recycling process.

The recycling device 15 comprises a first motor 22 and a reducer 23. The recycling reactor 17 and the cooling device 18 are spirally fed. The recycling reactor 17 is connected to the reducer 23. The first motor 22 is connected to the reducer 23 and drives the recycling reactor 17.

The cooling device 18 comprises a first spiral cooling pipe 19 and a second spiral cooling pipe 20. The two spiral cooling pipes are disposed in parallel under the recycling reactor 17. One end of the first spiral cooling pipe 19 is provided with a third motor 28. The third motor 28 drives the first spiral cooling pipe 19 to spirally rotate, and further drives the second spiral cooling pipe 20 to spirally rotate via a belt. The discharge outlet 21 is disposed on one end of the second spiral cooling pipe 20.

The feeding device 10, the recycling agent feeder 11, and the feed hopper 16 each are provided with a stirring device driven by a corresponding motor. The stirring device is controlled by the controller. The stirring device comprises a main shaft which is connected to the corresponding motor. Stirring blades or screws are equally distributed on the main shaft.

The recycling agent feeder 11 comprises a level gauge 27. The level gauge 27 transmits real-time parameters to the controller, so that a production status is available.

The mixing device 12 comprises a measuring bin 24, a mixing bin 25, and the second motor 26. The measuring bin 24 is disposed above the mixing bin 25, and is connected to the mixing bin 25 via a control valve. The control valve is electrically connected to the controller. The first screw feeder 13 is connected to the measuring bin 24. The recycling agent feeder 11 is connected to the measuring bin 24 via the pipe. The measuring bin 24 stores the proportioned materials and is ready to supply the materials for the mixing bin 25. The second screw feeder 14 is connected to the mixing bin 25. The mixing bin 25 comprises an agitator at a bottom thereof. The second motor 26 is connected to the agitator.

The production steps of the apparatus are as follows: smashing the waste rubbers into rubber powders, and adding the powders to the feeding device 10; adding proportioned recycling agent into the recycling agent feeder 11, and transmitting real-time parameters collected by the level gauge 27 to the controller; simultaneously adding the rubber powders and recycling agent into the measuring bin 24 via the first screw feeder 13 and the pipe, respectively; opening up the control valve via the controller, and fully stirring a reaction mixture in the mixing bin 25; feeding the reaction mixture into the feed hopper 16 via the second screw feeder 14; desulfurizing and plasticizing the reaction mixture, and discharging the recycled rubber from the discharge outlet 21.

The controlling of the apparatus and proportioning of the materials are automatic, so the preparation time and the work load are greatly saved. The proportioning, stirring, desulfurizing, and plasticizing are simultaneously conducted, so that the production efficiency is largely improved, and the environmental pollution of conventional waste rubber recycling is solved. The apparatus has a high yield, low energy consumption, low occupation rate, convenient operation, and the obtained recycled rubber has a high quality.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. An apparatus for recycling waste rubber, comprising:
    a) a feeding device;
    b) a recycling agent feeder;
    c) a mixing device;
    d) a recycling device, the recycling device comprising a feed hopper and a recycling reactor; and
    e) a controller;
   wherein:
    the feeding device is connected to the mixing device via a first screw feeder; the recycling agent feeder is connected to the mixing device via a pipe;
    the recycling device is located at one side of the mixing device;
    the feed hopper is provided with a second screw feeder, and the feed hopper is connected to the mixing device via the second screw feeder;
    the feed hopper comprises an outlet connected to the recycling reactor;
    the recycling reactor comprises a temperature controller and a cooling device which is disposed at one end of the recycling reactor; one end of the cooling device is provided with a discharge outlet; and
    the feeding device, the recycling agent feeder, the mixing device, and the recycling device are electrically connected to the controller.

2. The apparatus for claim 1, wherein the recycling device comprises a first motor and a reducer; the recycling reactor is connected to the reducer; the first motor is connected to the reducer and drives the recycling reactor.

3. The apparatus for claim 1, wherein the cooling device comprises a first spiral cooling pipe and a second spiral cooling pipe which are disposed in parallel under the recycling reactor; one end of the first spiral cooling pipe is provided with a third motor; the third motor drives the first spiral cooling pipe to spirally rotate, and further drives the second spiral cooling pipe to spirally rotate via a belt; the discharge outlet is disposed on one end of the second spiral cooling pipe.

4. The apparatus for claim 1, wherein the feeding device, the recycling agent feeder, and the feed hopper each are provided with a stirring device driven by a corresponding motor; the stirring device comprises a main shaft connected to the corresponding motor; stirring blades or screws are equally distributed on the main shaft.

5. The apparatus for claim 1, wherein the recycling agent feeder comprises a level gauge.

6. The apparatus for claim 1, wherein the mixing device comprises a measuring bin, a mixing bin, and a second motor; the measuring bin is disposed above the mixing bin, and is connected to the mixing bin via a control valve; the control valve is electrically connected to the controller; the first screw feeder is connected to the measuring bin; the recycling agent feeder is connected to the measuring bin via the pipe; the second screw feeder is connected to the mixing bin; the mixing bin comprises an agitator at a bottom thereof; the second motor is connected to the agitator.

\* \* \* \* \*